United States Patent
Satoh et al.

(10) Patent No.: US 8,604,939 B2
(45) Date of Patent: Dec. 10, 2013

(54) ELECTRONIC BALANCE

(75) Inventors: Tsuyoshi Satoh, Kyoto (JP); Hiroshi Hamamoto, Kyoto (JP); Koji Hattori, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 732 days.

(21) Appl. No.: 12/307,917

(22) PCT Filed: Jul. 24, 2007

(86) PCT No.: PCT/JP2007/064479
§ 371 (c)(1),
(2), (4) Date: Mar. 11, 2010

(87) PCT Pub. No.: WO2008/013156
PCT Pub. Date: Jan. 31, 2008

(65) Prior Publication Data
US 2010/0164738 A1      Jul. 1, 2010

(30) Foreign Application Priority Data
Jul. 25, 2006   (JP) .................................. 2006-201730

(51) Int. Cl.
*G08B 21/00*   (2006.01)

(52) U.S. Cl.
USPC ........... 340/666; 73/1.03; 177/25.13; 177/45; 700/240; 702/173

(58) Field of Classification Search
USPC .......... 340/666, 613, 691.3; 73/865; 700/240; 235/385; 702/173, 41; 177/226, 50, 45, 177/25.13, 25.19
See application file for complete search history.

(56) References Cited

U.S. PATENT DOCUMENTS 4,155,255 A * 5/1979 Sherman et al. ................. 73/462
8,224,483 B1 * 7/2012 Ansari et al. .................. 700/240

FOREIGN PATENT DOCUMENTS

| JP | 60-210727 | 10/1985 |
| JP | 61-292023 | 12/1986 |
| JP | 01-239425 | 9/1989 |
| JP | 5-256683 | 10/1993 |
| JP | 05-256683 | 10/1993 |
| JP | 5-256686 | 10/1993 |
| JP | 05-256686 | 10/1993 |

OTHER PUBLICATIONS

Chinese First Examination Report of China Application No. 2007800106447, dated Sep. 18, 2009.

* cited by examiner

*Primary Examiner* — Brent Swarthout
(74) *Attorney, Agent, or Firm* — J. C. Patents

(57) ABSTRACT

An electronic balance for clearly indicating the degree of precision to a target weight value is provided. A signal converter (2) converts an electronic signal outputted from a weight detecting circuit (1) into a digital signal. A computing section (3) converts the digital signal into a measured weight value $W_x$, reads a target weight value $W_d$ ($=W_0 \pm \Delta W$) determined by a target center value $W_0$ and a tolerance $\pm \Delta W$ inputted from a weight setting unit (5) through an interface (4), compares the measured weight value $W_x$ and the target weight value $W_d$ to obtain a difference, and transmits a signal for flashing or turning on the character display corresponding to the difference and the measured weight value $W_x$ to a display unit (6) and transmits a sound signal to a buzzer (7).

3 Claims, 3 Drawing Sheets

ELECTRONIC BALANCE

BACKGROUND OF THE INVENTION

1. Field of the Invention

The present invention generally relates to an electronic balance/balance, in particular, to an electronic balance/balance having a weight setting function and a precision displaying function. The weight setting function is to select a weight and set a target weight value, and the precision displaying function is to display a degree of precision between the target weight value and a measured weight value.

2. Description of Related Art

Besides the electronic balance/balance merely having the function of weighing a weighing object, the electronic balance/balance having a weighing function and a measuring function can also be found. The measuring function includes setting a target weight value by the user in advance, adding or subtracting the measured weight value, so as to weigh the weighing object of the weight in the range of the target weight value. The electronic balance adopts the following method, i.e., in order to weigh objects more effectively, a combination of character display and picture display color is used to display a degree of precision between the target weight value and the measured weight value when the measured weight value is displayed (e.g., in Patent Document 1), or a bar display is simulated to display the measured weight value and the degree of precision.

Patent Document 1: Japanese laid-open Gazette 5-256686

In the above electronic balance for weighing in the past, which displays the degree of precision between the target weight value and the measured weight value is displayed by means of a combination of character display and picture display colors. The pictures display is determined on one hand and characters display is read on the other hand; hence, a reduction in the reading error of pictures is definitely achieved, when compared with the electronic balance merely using character display to display the degree of precision. But the electronic balance still has the following problems: due to the combination of the displayed colors, the confirmation of the picture display becomes more complicated and the reception of information is delayed; thus, a reading error is easily resulted from the disarray of the displayed colors. Moreover, in the electronic balance adopting the bar display, the measured weight values may be displayed in further details. Of course, the more bar sections the balance displays, the easier it is for the user of the balance to identify the current weighed value. However, there exists a problem in which the number of the displayed sections is limited by the number of signal lines of the display unit.

SUMMARY OF THE INVENTION

The present invention is directed to an electronic balance having a weighing unit for measuring a target weight, and the electronic balance includes: a weight setting unit for selecting a weighing object and setting a target weight value for the weighing object; a selecting unit for comparing the target weight value with a measured weight value and selecting a character display corresponding to a degree of precision between these two values; and a character display flashing unit for flashing the selected character display. Moreover, a flashing interval adjusting unit is configured in the character display flashing unit, for adjusting a flashing interval according to the degree of precision. In addition, a sound unit is configured in the electronic balance of the present invention, for informing by means of sound effect that the weighed value has reached the target weighing value.

EFFECT OF INVENTION

In the electronic balance of the present invention, since the flashing interval of the character display is shortened when the target weighing value and the measured value become closer, the weight of the weighing object can be adjusted appropriately, so that the reading error of the character display is less likely to occur. In addition, the same effect can be achieved by using a display unit constituted by less display sections than in the bar display.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Reference will now be made in detail to the present embodiments of the invention, examples of which are illustrated in the accompanying drawings. Wherever possible, the same reference numbers are used in the drawings and the description to refer to the same or like parts.

DESCRIPTION OF THE EMBODIMENTS

The first feature of the electronic balance in the present invention lies in that the electronic balance includes a weighing unit for weighing a target weight, and also includes a weight setting unit for selecting a weighing object and setting a target weighing value for the weighing object; a selecting unit, comparing the weighing target value with a weighed value and selecting a character display corresponding to a degree of precision between these two values; and a character display flashing unit, flashing the selected character display. Moreover, the second feature of the electronic balance in the present invention lies in that: a flashing interval adjusting unit is configured in the character display flashing unit, for adjusting a flashing interval according to the degree of precision. In addition, the third feature of the electronic balance in the present invention lies in that: a sound unit is configured in the electronic balance of the present invention, for informing the user by sound effect that the measured weight value has reached the target weighing value.

Therefore, the optimal type of basic construction is an electronic balance composed of the aforementioned first, second, and third features.

Embodiment 1

Figure 1:
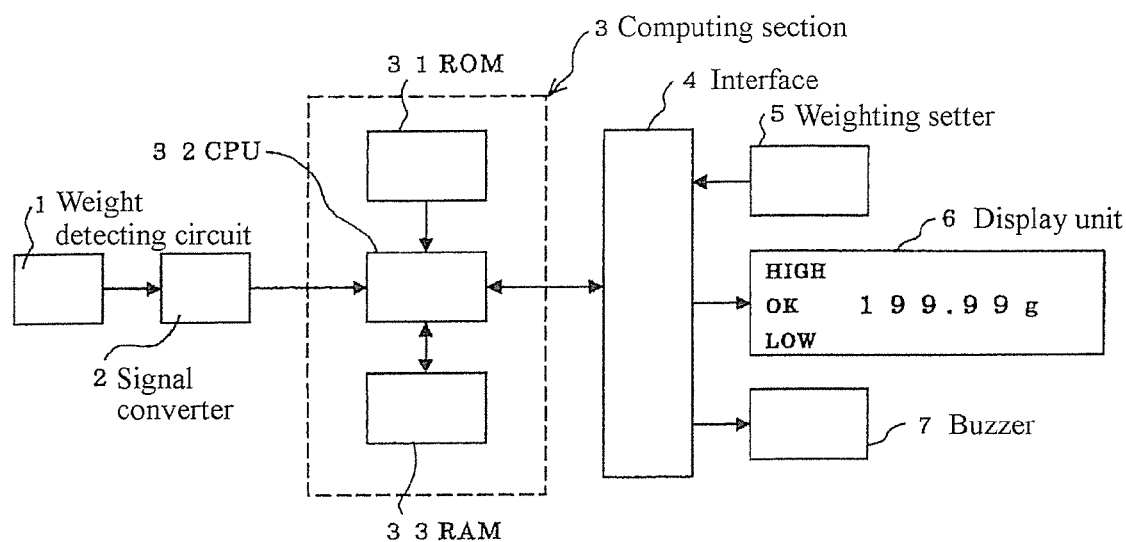
FIG. 1 is a block diagram of the brief structure of an electronic balance according to an embodiment of the present invention.

An embodiment of the present invention is illustrated with reference to FIG. 1. The electronic balance includes: a weight detecting circuit 1 for integrating one or more pressure sensors combined with a weight detecting means (omitted in the drawings) utilizing a Roberval means; a signal converter 2 for performing an A/D conversion on an electronic signal detected by the weight detecting circuit 1, so as to convert the electronic signal into a digital signal; and a computing section 3 for performing a computation on the digital signal to obtain a measured weight value $W_x$, and reading a target weight value $W_d$ (=$W_0 \pm \Delta W$) determined by a target center value $W_0$ inputted from a weighting setter 5 and a tolerance value $\pm \Delta W$, comparing the measured value $W_x$ and the target weight value $W_d$ to obtain a difference, transmitting a flashing display signal for flashing character display corresponding to the difference, and the measured value $W_x$ to a display unit 6 and transmitting a sound signal to a buzzer 7. The weighting setter 5 has a selection key for selecting weighing options through an interface 4, and number keys for inputting the target weight value. The flashing interval of the flashing display signal is shortened when the target weight value $W_d$ and the measured weight value $W_x$ become closer. Thereby, the user of the electronic balance can determined the degree of precision between the measured value and the target weight value according to the flashing interval.

The computing section 3 performs a computation on the digital signal from the signal converter 2, so as to convert the digital signal into a weight value. The computing section 3 includes: a read only memory (ROM) 31 for storing a computing program that displays the weight value, a central processing unit (CPU) 32 for executing the computing program, and a random access memory (RAM) 33 for storing the computation result or the computation parameters. Moreover, the display unit 6 displays the weight measured value $W_x$ and selectively displays the characters "LOW", "OK", and "HIGH".

Figure 2:
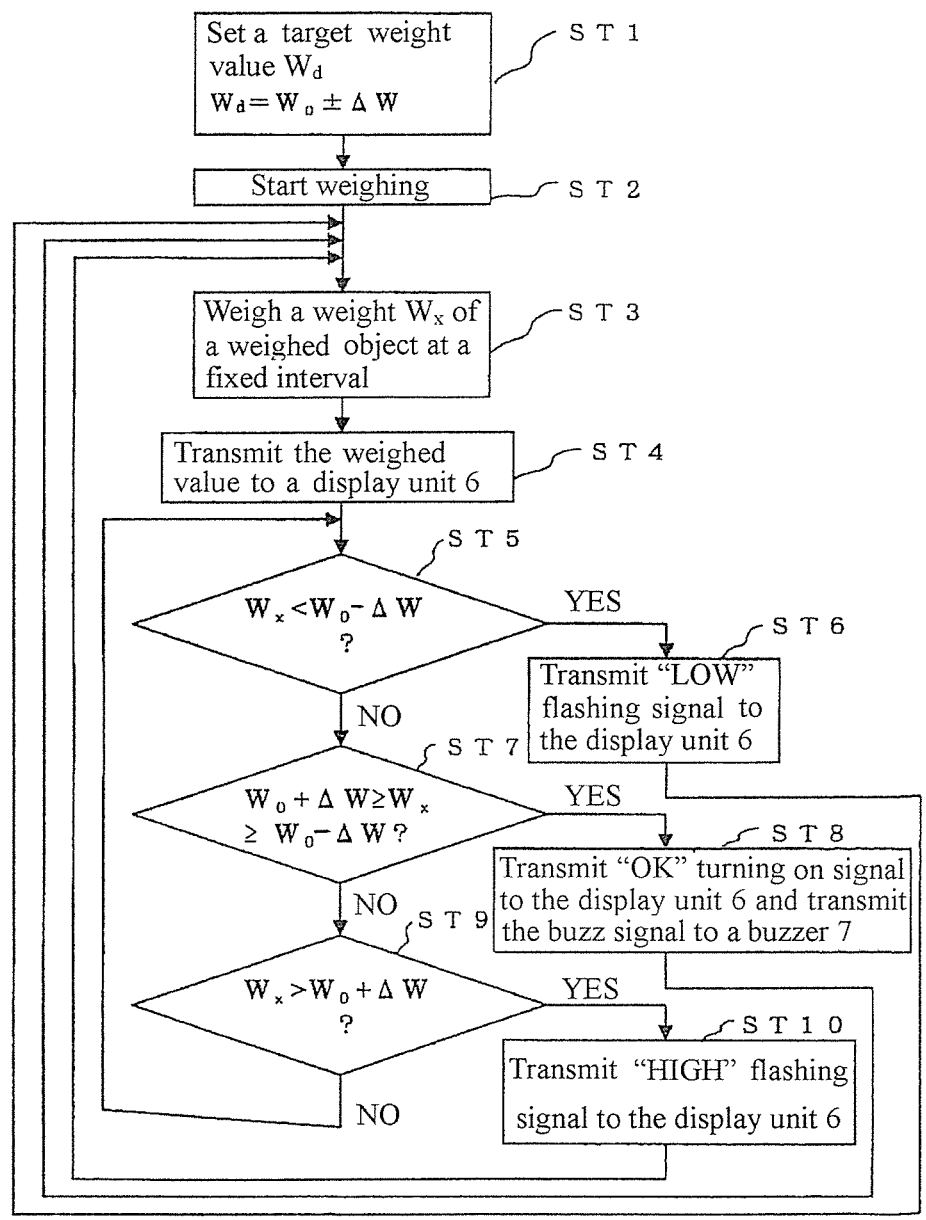
FIG. 2 is a flow chart showing an operation sequence of the electronic balance according to the present invention.
Figure 3A:
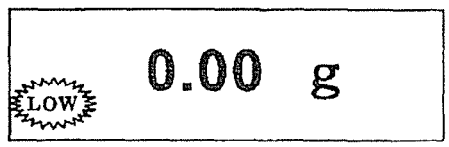
FIGS. 3(A)~3(F) is a schematic view showing picture changes of a display unit according to an embodiment of the present invention.
Figure 3B:
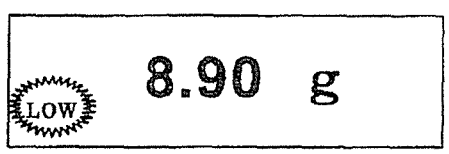
Figure 3C:
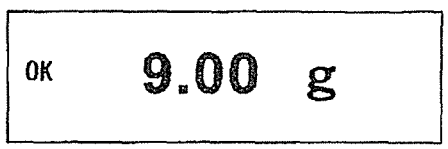
Figure 3D:
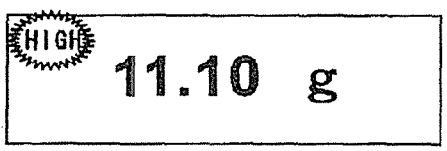
Figure 3E:
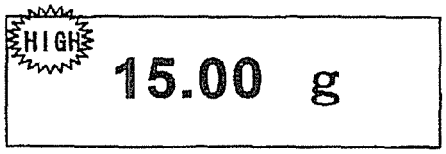
Figure 3F:
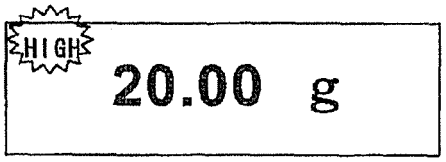

The operation sequence of the measuring process executed by the electronic balance is illustrated below with reference to FIGS. 1 and 2. First, the weight setting unit 5 is used to select the weighing object, the target center value $W_0$ and the tolerance $\pm \Delta W$ are inputted, and the target weight value $W_d$ is set (ST1). Then, weighing is executed (ST2). At a fixed interval, the signal converter 2 converts the output signals of the weight detecting circuit 1 to a digital value, and transmits the digital value to the computing section 3. The computing section 3 converts the digital value into a measured weight value $W_x$ of a weighing object through the computing program (ST3). The measured weight value $W_x$ is transmitted to the display unit 6 and displayed on the display unit 6 (e.g., 199.99 g) (ST4), and is compared with the lower limit of the target weight value ($W_0 - \Delta W$) (ST5).

When the measured weight value $W_x$ is not higher than the lower limit ($W_0 - \Delta W$), the flashing signal "LOW" is transmitted to the display unit 6 (ST6), and the next weighing process is executed. A flashing interval $T_1$ is calculated through the following Equation (1):

$$T_1 = K(W_0 - \Delta W - W_x)/W_s + 0.1 \text{ (sec)} \quad (1)$$

where K (proportion coefficient)=20, W (weighing range)=200 g. Moreover, when the measured weight value $W_x$ is larger than or equals to the lower limit ($W_0 - \Delta W$) and is smaller than or equals to the upper limit ($W_0 + \Delta W$) (ST7), an "OK" turning on signal is transmitted to the display unit 6, and a buzzer signal is transmitted to the buzzer 7 (ST8), and then the next weighing is executed. When the weight-measured value $W_x$ exceeds the upper limit ($W_0 + \Delta W$), a "HIGH" flashing signal is transmitted to the display unit 6 (ST10); then the next weighing process is executed. A flashing interval $T_2$ is calculated through the following Equation (2).

$$T_2 = K(W_x - (W_0 + \Delta W))/W_s + 0.1 \text{ (sec)} \quad (2)$$

Then, FIG. 3 (A)~FIG. 3 (F) illustrate the changes of the picture on the display unit 6 during a weighing process of an electronic balance having a weighing span of 200 g, a minimum display of 0.01 g, a target weight value set to 10 g, and a tolerance set to ±1 g. When no weighing object is placed in the weighing tray of the electronic balance, i.e., the weight is 0.00 g, "LOW" blinks at an interval of 1 s (A). After the weighed value is changed into 8.90 g, "LOW" blinks at an interval of 0.11 s. Then, when the weighed value reaches the lower limit, i.e., 9.00 g, of the target weight value, "OK" is turned on continuously and the buzzer 7 buzzes to remind that the weight of the weighing object has reached the target weight value. Moreover, if the measured weight value exceeds the upper limit of the target weight value and reaches 11.10 g, the "HIGH" signal flashes at an interval of 0.11 s. Moreover, after the measured weight value is changed to 15.00 g, the "HIGH" signal flashes at an interval of 0.5 s, and when the measured weight value is changed to 20.00 g, the "HIGH" signal flashes at an interval of 1 s.

In the aforementioned embodiment, according to the degree of precision between the measured weight value and the target weight value, the flashing interval changes continually according to Equations (1) and (2). However, the present invention is not limited to be so. The flashing interval can also be changed in stages by accurately discerning the change of the flashing interval. Moreover, the proportion coefficient K can be changed according to the flashing interval suitable for the weighing operation performed by a user.

INDUSTRIAL APPLICABILITY

The present invention is applicable to an electronic balance/balance having a measuring function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic balance, having a weighing unit for weighing a target weight, the electronic balance comprising:
   a weight setting unit, selecting a weighing object and setting a target weight value for the weighing object, wherein the target weight value is determined by a target center value and a tolerance value;
   a selecting unit, comparing the target weight value with a measured weight value and selecting a character display corresponding to a degree of precision between these two values; and
   a character display flashing unit, flashing the selected character display,
   wherein a flashing interval adjusting unit is configured in the character display flashing unit, for adjusting a flashing interval according to the degree of precision, and the flashing interval of the character display corresponds to the degree of precision in a manner that the closer the shorter,
   wherein a value of proportion coefficient is set in a computing process to obtain the flashing interval, and the value of proportion coefficient can be changed according to the degree of precision required by a user suitable for a desired weight operation.

2. The electronic balance according to claim 1, wherein the flashing interval is changed in stages.

3. The electronic balance according to claim 1, wherein the flashing interval is changed continuously.

\* \* \* \* \*